Feb. 2, 1943. F. E. JOHNSON 2,309,731
ROTARY OPERATIVE FASTENER
Filed Nov. 10, 1938
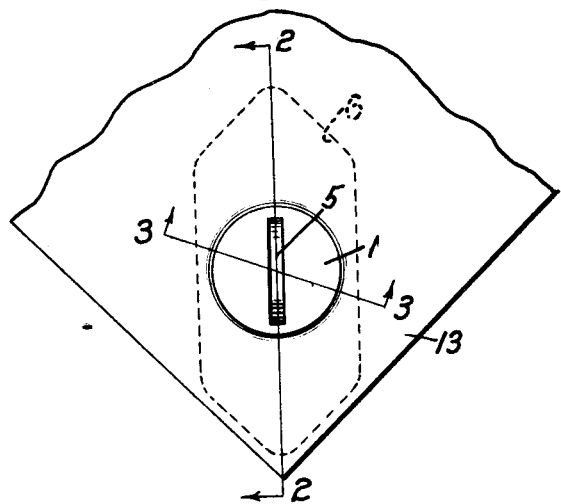
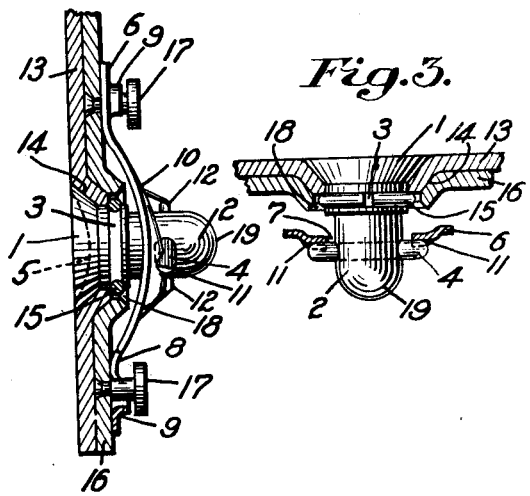
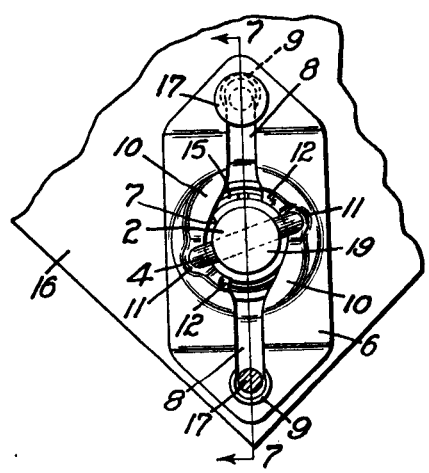
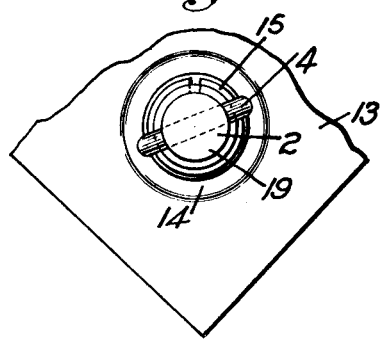
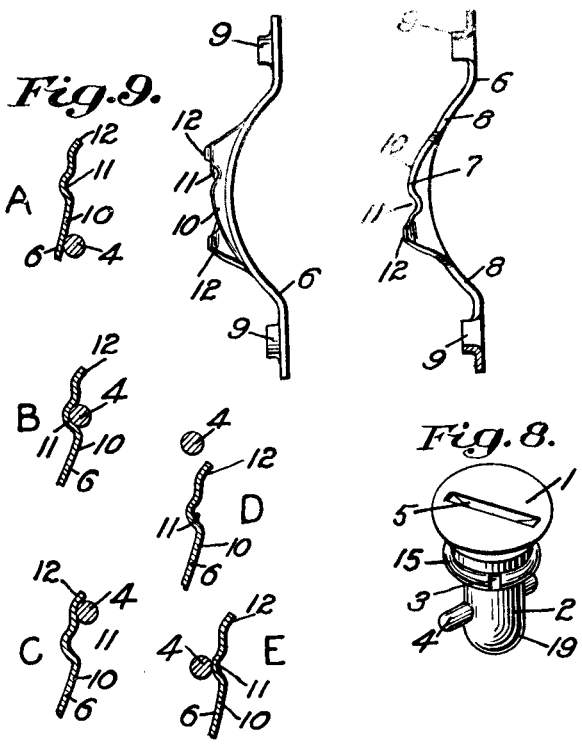
Inventor:
Frank E. Johnson
by Walter S. Jones Atty.

Patented Feb. 2, 1943

2,309,731

UNITED STATES PATENT OFFICE 2,309,731

ROTARY OPERATIVE FASTENER

Frank E. Johnson, Malden, Mass., assignor to United-Carr Fastener Corporation, Cambridge, Mass., a corporation of Massachusetts Application November 10, 1938, Serial No. 239,815

13 Claims. (Cl. 24—221)

My invention aims to provide improvements in fasteners for securing together two or more elements, preferably plate-like, the fasteners being of the so-called rotary operative type.

In the drawing which illustrates a preferred embodiment of my invention:

Fig. 1 is an elevational view of an installation showing a portion of a corner thereof secured by my improved fastening means;

Fig. 2 is a section taken on the line 2—2 of Fig. 1, the fastener being shown in side elevation except for a part of the spring being broken away at one end to show the rivet attachment;

Fig. 3 is a section taken on the line 3—3 of Fig. 1 with the rotating member remaining in elevation;

Fig. 4 is a rear view of the installation shown in Fig. 1;

Fig. 5 is a rear view of the rotary member and a portion of the plate to which it is attached;

Fig. 6 is a side elevation of the spring member shown in Fig. 4;

Fig. 7 is a section of the spring per se taken on the line 7—7 of Fig. 4;

Fig. 8 is a perspective view of the rotating member of the fastener; and

Fig. 9 is a sort of schematic representation of the relation of the spring to the pin during relative rotative movement.

My invention, as illustrated by the drawing, relates particularly to an improved fastener of what is known, in the aeroplane industry at least, as a cowl fastener and it operates by rotation of one member of the fastener. My fastener may be used in connection with securing together various parts of aeroplanes and it may also be used in connection with any other installation where it is desired to use a strong, durable fastener which may be engaged or disengaged by rotation of one of the parts of the fastener.

Referring to the rotating part of the fastener I have illustrated one which is formed in two pieces. One is preferably made of a rustless, light, durable metal such as aluminum and has a head portion 1, a shank portion 2 and a groove 3 just beneath the head portion. The other member of the rotating part is in the form of a pin 4 formed of a relatively hard material such as carbon steel and it is driven or otherwise secured in an aperture extending normal to the axis of the shank 2 so that opposite ends of the pin extend beyond opposite surfaces of the shank, as shown in Fig. 3. The head 1 is provided with a slot 5 to receive a suitable implement by which the device may be rotated.

The spring member of the fastening device is preferably formed from a durable spring material and is in the form of an arched plate-like member 6 having a central substantially circular aperture 7 and a pair of slots 8—8 extending from opposite sides of the aperture 7 and terminating adjacent opposite ends of the spring, as shown in Fig. 4. Adjacent to the ends of these slots I have provided reenforcing means in the form of upwardly turned lip portions 9—9 to reenforce the metal and prevent cracking or breaking between the ends of the slots 8—8 and the ends of the spring. The spring plate is embossed on opposite sides of the aperture 7 and these embossed portions preferably extend in arcs concentric with the center of the apertures 7. Each embossed portion has a gradually rising cam surface 10 extending from a low point adjacent to one of the slots 8 and continuing to a high point adjacent to the other slot, as shown in Figs. 4 and 7. Intermediate the ends of the embossed portion just described I have provided a recess 11 into which the pin 4 normally fits when the two parts of the fastener are properly engaged. At the high end of the embossed portion there is preferably provided a slightly up-turned ear 12 the purposes of which will be more fully described in connection with the operation of the fastener.

While the installation of my fastener may vary as to the number and thickness of parts to be secured together, I have selected for illustration the securing together of two plate-like portions, as illustrated in Fig. 2. The plate-like portion 13 is provided with an aperture adjacent to the corner (Fig. 1) and the aperture is surrounded by a conical wall 14 which provides a bearing surface for the head 1 of the rotating member which is also conical and is assembled in a flush manner with the plate 13, as shown in Fig. 2. The rotating member is held in assembled position by a ring-like spring 15 snapped into the recess 3 formed in the rotating member, as clearly shown in Fig. 3.

The spring plate 6 is preferably secured to a plate-like member 16 adjacent to a corner of the installation (Fig. 4) by shouldered rivets 17—17 in such a manner that the spring may float to prevent interference from the rivets during compressing action exerted upon the bow-shaped spring plate. These rivets are preferably located so that they pass through the slots 8—8 near their ends and the lip portions 9—9. It will also be noted that the ends of the spring plate 6 are tapered so that the spring may be assembled with one end of the spring toward the corner of its plate portion 16, thus permitting the center of the fastener to be located at a point with respect to two sides of the plate which is closer than has been possible with any commercial fastener of which applicant is aware.

To assemble the plate 13 in engagement with the plate 16 it is only necessary to bring the two plates in a superposed position where the aperture in the plate 13 is in approximate alignment with an aperture 18 behind which is located the aperture 7 in the spring plate 6. As the shank 2 of the rotating member passes through the aperture 18 its rounded nose 19 enters the aperture 7 and is guided through the spring 6 even though there is some misalignment. As the entering operation continues the pin passes through the slots 8—8 if it happens to be aligned therewith, but if not it will pass through upon rotation of the fastener and pressure exerted at the same time. After the pin has passed through the slots 8—8 and it is rotated in a clockwise direction, the ends of the pin 4 engage over the rising surfaces 10—10 of the arc-shaped embossing and the spring is compressed as rotation continues. When the ends of the pin arrive at the recesses 11—11 the spring, because of its tendency to return to its normal shape, presses the spring against the pin so that it enters the recesses and is held against accidental rotation by vibration once the parts are fastened together. If there is an attempt to rotate the rotating member beyond the point where the pin enters the recesses, such rotation may continue until the ends of the pin come in contact with the upwardly turned ears 12—12. The rise on the cam surfaces at those points is such that the ears form stops and the spring engages the conical-shaped portion of the plate 16, thus preventing further rotation of the parts. Therefore, it is impossible to rotate the fastener in a clockwise direction to a position where it would be unlocked and if rotation stops where the ends of the pin 4 contact the ears 12—12 it would automatically return to a position where the ends of the pin would be in the recesses 11—11, when there is sufficient vibration to cause rotation between the parts.

When it is desirable to unlock the fastener it is merely necessary to turn the rotating member approximately 180° or to any number of degrees beyond the amount necessary to bring the pin opposite the slots 8—8. Any rotation of the pin beyond the slots in a contra-clockwise direction merely causes an ejecting action because the pin will ride underneath the spring plate and the parts may be separated very easily without the necessity for actual alignment of the pin 4 with the slots 8—8.

In order to make it entirely clear just what takes place during the engaging and disengaging operations between the spring and the pin, I have shown five different views marked A, B, C, D and E respectively to show the various positions of the parts. In Fig. 9, view A, I have shown the position of the spring and pin as the pin begins to ride up the cam surface 10. In view B I have shown the spring slightly compressed and the pin resting in the recess 11 which is the normal locking position between the parts. Referring to view C I have shown the spring still further compressed and the pin riding to the high spot or against the ear 12 which acts as a stop. Upon reverse rotation of the part carrying the pin the pin will be brought around to the other side of the cam surface of the spring (view D) so that it will enter beneath the ear 12 and force the spring outwardly, as indicated in view E. In this manner it will be readily seen that the fastener is self-ejecting and that the parts are separated merely by rotation of the rotating member a sufficient number of degrees in a contra-clockwise direction.

My improved fastener is simple in construction, the parts thereof may be easily and quickly assembled to their supporting structures and any suitable thickness of installation may be taken care of merely by an increase or decrease in the length of the shank from the head or the position of the pin 4 with respect to the head 1.

While I have illustrated and described a preferred embodiment of my invention I do not wish to be limited thereto because the scope of my invention is best defined by the following claims.

I claim:

1. A member for fastener cooperation with a rotating member of the type having a shank and at least one projection extending from said shank, said member being formed from a single piece of sheet metal comprising an attaching portion and an outwardly spaced apertured portion adapted to receive a portion of the shank and the projection of the rotating member and a rigid integral embossed portion on said apertured portion arranged on an arc concentric with the center of the aperture providing a gradually rising cam surface, a depression, and a stop for cooperation with said projection during rotative movement.

2. A bowed spring member for cooperation with a rotating member of the type having a shank and at least one projection extending from said shank, said spring being formed from sheet metal and having an aperture to receive a portion of the shank and the projection of the rotating member, said spring having slots extending from opposite sides of the aperture towards ends of the spring to increase resiliency of the spring and shaped at their ends to receive rivets and the like for fastening the spring to a support.

3. A spring member adapted for fastener cooperation with a rotating member having a shank and at least one projection extending from said shank, said spring being formed from sheet metal and having an aperture to receive a portion of the shank and the projection of the rotating member, said spring having slots extending from opposite sides of the aperture towards ends of the spring to increase resiliency of the spring and shaped at their ends to receive rivets and the like for fastening the spring to a support and reinforcing means adjacent to the ends of said slots adjacent to where the rivets pass through for strengthening the spring between the ends of the slots and the ends of the spring.

4. A spring member for fastener cooperation with a rotating member of the type having a shank and at least one projection extending from said shank, said spring being formed from sheet metal having an aperture adapted to receive a portion of the shank and the projection of the rotating member, a rigid embossed portion in said spring concentric with the center of the aperture, said embossed portion providing a gradually rising cam surface, a depression and a stop for cooperation with said projection during rotative movement, said embossed portion being relatively low at one end adjacent the aperture to permit the projection on the rotating member to ride up over the upper surface of the boss and being high at the other end adjacent to the aperture to permit the projection to pass under the spring during the normal unfastening rotation of the parts.

5. A spring member adapted for fastener cooperation with a rotating member of the type having a head, a shank, and at least one projection extending from said shank, said spring being formed from sheet metal having an aperture adapted to receive a portion of the shank and the projection of the rotating member, said spring having slots extending from opposite sides of the aperture towards ends of the spring to increase resiliency of the spring and to receive rivets and the like for fastening the spring to a support, and an embossed portion in said spring on an arc concentric with the center of the aperture, said embossed portion providing a gradually rising cam surface, a depression, and a stop for cooperation with said projection during rotative movement, said embossed portion being low adjacent to where one slot joins the aperture to permit the projection on the rotating member to ride up over the upper side of the spring and being high at the point where the other slot joins the aperture whereby the projection may pass under the lower side of the spring during unfastening of the parts, and said embossed portion being the same on both sides of the aperture.

6. A rotary operative type of fastener providing a rotating member and a spring member, said rotating member having a head, a shank, and at least one projection extending from said shank, said spring being formed from sheet metal having an aperture for passage of a portion of said shank and the projection of the rotating member, a rigid embossed portion in said spring concentric with the center of the aperture, said embossed portion having a gradually rising cam surface on its upper side, a depression on its upper side providing a complementary projection on its lower side, said embossed portion being low at one end adjacent to the aperture to permit the projection on the rotating member to ride up over the upper side of the embossment and being high at the other end adjacent to the aperture whereby the projection may pass under the spring in normal unfastening rotation of the rotating member to engage the projection of the rotating member with the projection of the embossment to effect automatic separation of the parts.

7. In a cowl fastener, a female fastening element of sheet metal adapted to be secured to one side of a support and to cooperate with a rotary pin equipped with radial arms and secured to a member to be fastened to said support, said fastener element having portions adapted to be attached to said support, substantially rigid central means held in outwardly spaced relation to said portions attached to the support, connecting means between said central means and said attaching portions allowing the former to be forced toward such support, said central means having an opening to receive the end of such pin and also having oppositely disposed radial elongations adapted to admit the radial arms of said pin, marginal portions of said opening and elongations being shaped to provide an arcuate permanently rigid shape concentric with said opening and dished outwardly with respect to said adjacent side of said central means, said shape providing rigid cam and seat means for cooperation with and interlocking engagement with such radial arms in response to a turning movement of said pin.

8. In a cowl fastener, a female fastening element comprising a sheet metal strip adapted to be secured to one side of a support and to cooperate with a rotary pin provided with radial arms and secured to a member adapted to be fastened to said support; said fastener having portions adapted to be attached to said support, a substantially rigid central portion held in outwardly spaced relation to said portions attached to said support, connections between said central and attaching portions allowing the former to be forced toward said support, said central portion having a substantially circular opening to receive the end of the pin and radial elongations adapted to admit the radial arms of such pin, marginal portions defining said opening being shaped to provide a permanently rigid shape dished outwardly with respect to the adjacent sides of said fastener, said shape providing inwardly facing cam lips at corresponding sides of said elongations, inclined arcuate cams extending outwardly from said cam lips along the margin of said opening for guiding said pin arms onto said central portion and forcing the latter toward said support in response to turning movement of the pin, each of the cams terminating in a distinct hump, and radial grooves adjacent the humps below the level thereof to receive and hold the arms under tension when the same have been turned beyond the humps.

9. A fastener element as described in claim 8, each said marginal portions being shaped to provide an integral abutment projecting outwardly therefrom adjacent each of the grooves to prevent turning of the pin arms beyond the grooves.

10. In a fastener for cowling and the like, a female fastening member comprising a strip of sheet metal formed to provide a base portion for attachment to a support and a rigid central portion held in outwardly spaced relation to said base portion, said central portion having a central aperture and oppositely disposed radial elongations of said aperture and adapted to receive the end portion and radial arms respectively of a cooperating rotary male fastening element, the metal at one side of each of said elongations adjacent said aperture providing an inwardly directed cam lip, a pair of oppositely disposed inclined arcuate cam portions bordering said aperture on the upper face of said central portion, each of said cam portions extending outwardly from one of said cam lips and leading to a groove disposed radially with respect to said aperture and each cam portion comprising a distinct hump next to the corresponding groove and projecting above the metal adjacent thereto.

11. In a fastener for cowling and the like, a female fastening member comprising a strip of sheet metal formed to provide base portions for attachment to a support and a rigid central portion held in outwardly spaced relation to said base portions, said central portion having a central circular aperture and oppositely disposed radial elongations of said aperture and adapted to receive the end portion and radial arms respectively of a cooperating rotary male fastening element, the metal at one side of said apertures providing an inwardly directed cam lip, a pair of oppositely disposed inclined arcuate cam portions bordering said aperture on the upper face of said central portion, each of said cam portions extending outwardly from one of said cam lips and leading to a groove disposed radially with respect to said aperture, each cam portion comprising a distinct hump defining one side of its corresponding groove and projecting above the metal adjacent thereto, and an integral abutment projecting upwardly from the metal bordering said aperture on the other side of each groove to prevent turning movement of a pin arm therebeyond.

12. In a fastener for cowling or the like, a fastening element comprising an elongated strip of stamped and hardened sheet metal having a rigid central portion with an aperture adapted to receive a cooperating rotary fastening element, means for securing a part of said fastening element at spaced points to a part to be fastened, said central portion being drawn and rigid in all directions around the margins of said aperture and the marginal portions thereof defining said aperture being deformed to provide rigid cam and seat means for interlocking engagement with fastening means on such rotary fastening element in response to turning movement of the latter.

13. In a fastener for cowling or the like, a fastening element comprising an elongated strip of stamped and quench-hardened sheet steel having a rigid central portion with an aperture adapted to receive a cooperating rotary fastening element, means for securing a part of said fastening element at spaced points to a part to be fastened, said central portion being drawn and rigid in all directions around the margins of said aperture, the marginal portions thereof defining said aperture being deformed to provide oppositely disposed, inclined rigid cams extending outwardly from corresponding sides of said radial openings, rigid humps at the tops of said cams, oppositely disposed rigid radial grooves next to said humps for receiving and holding such radial arms, and oppositely disposed rigid abutments next to said grooves to prevent rotation of said arms beyond said grooves, the path of rotation between the axis of said openings and the axis of said grooves covering an angle substantially greater than 90°.

FRANK E. JOHNSON.